United States Patent
Reithmaier et al.

(10) Patent No.: US 10,337,544 B2
(45) Date of Patent: Jul. 2, 2019

(54) SCREW AND SCREW CONNECTION FOR COMPONENTS MADE OF FOAMED PLASTIC

(71) Applicant: Lisa Draexlmaier GmbH, Vilsbiburg (DE)

(72) Inventors: Tanja Reithmaier, Aich (DE); Norbert Simon, Geisenhausen (DE); Leonard Dobos, Kröning (DE); Gregor Hoedl, Ergoldsbach (DE); Johann Petermaier, Dingolfing (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 126 days.

(21) Appl. No.: 15/446,412

(22) Filed: Mar. 1, 2017

(65) Prior Publication Data
US 2017/0254345 A1  Sep. 7, 2017

(30) Foreign Application Priority Data

Mar. 4, 2016 (DE) .......................... 10 2016 103 931

(51) Int. Cl.
*F16B 5/01* (2006.01)
*F16B 33/02* (2006.01)
(Continued)

(52) U.S. Cl.
CPC ............ *F16B 5/01* (2013.01); *F16B 25/0015* (2013.01); *F16B 25/0047* (2013.01); *F16B 33/02* (2013.01); *F16B 5/02* (2013.01)

(58) Field of Classification Search
CPC .......... F16B 5/01; F16B 5/02; F16B 25/0015; F16B 25/0047; F16B 25/0073; F16B 33/02; B21D 39/00
(Continued)

(56) References Cited

U.S. PATENT DOCUMENTS

| 2,352,982 A | * | 7/1944 | Tomalis | ............. F16B 25/0047 411/422 |
| 3,297,213 A | * | 1/1967 | Henderson | ............. B65D 39/08 220/288 |

(Continued)

FOREIGN PATENT DOCUMENTS

| DE | 100 48 975 C1 | 7/2002 |
| DE | 201 14 907 U1 | 1/2003 |

(Continued)

OTHER PUBLICATIONS

Office Action in German Application No. DE 10 2016 103 931.4, dated Dec. 19, 2016.

*Primary Examiner* — Roberta S Delisle
(74) *Attorney, Agent, or Firm* — Finnegan, Henderson, Farabow, Garrett & Dunner LLP (57) ABSTRACT

The present disclosure relates to a screw connection comprising a support component, an additional component and a screw to fasten the support component to the additional component. The support component has a tube made of thermoplastic foam to accommodate the screw in a friction and positive fit. The screw has a blunt-edged thread, enabling the screw to compress the foam in the tube as it is driven in. The ratio of the inner diameter of the tube to the diameter of the screw depends on the degree of foaming of the tube and decreases as the degree of foaming increases. In comparison to conventional screws, the threads of the screw of the present disclosure penetrate less deeply into the foam or they displace it, preventing damage to the tube while enabling a tight fit.

24 Claims, 4 Drawing Sheets

(51) Int. Cl.
*F16B 25/00* (2006.01)
*F16B 5/02* (2006.01)

(58) Field of Classification Search
USPC .......................................... 411/411, 413, 415
See application file for complete search history.

(56) References Cited

U.S. PATENT DOCUMENTS

| | | | | |
|---|---|---|---|---|
| 5,413,445 | A | * | 5/1995 | Cartellone ............... B66C 1/125 294/89 |
| 5,704,750 | A | | 1/1998 | Bartos et al. |
| 7,658,581 | B2 | * | 2/2010 | Sußenbach ......... F16B 25/0015 411/411 |
| 7,997,842 | B2 | * | 8/2011 | Diekmeyer ............ B01D 27/00 411/366.1 |
| 8,506,227 | B2 | * | 8/2013 | Karupaya ........... F16B 25/0047 411/411 |
| 2006/0263171 | A1 | * | 11/2006 | Schwarz ............. F16B 25/0021 411/411 |
| 2012/0034048 | A1 | * | 2/2012 | Karupaya ............. B21H 3/027 411/402 |
| 2012/0189401 | A1 | * | 7/2012 | Chiu .................... F16B 37/065 411/103 |

FOREIGN PATENT DOCUMENTS

| | | |
|---|---|---|
| DE | 10 2009 024 264 A1 | 12/2010 |
| DE | 10 2014 114 165 A1 | 3/2016 |
| EP | 0 133 773 A1 | 3/1985 |
| EP | 2 185 828 B1 | 5/2010 |

* cited by examiner

Fig. 1

(Prior Art)

SCREW AND SCREW CONNECTION FOR COMPONENTS MADE OF FOAMED PLASTIC

CROSS REFERENCE TO RELATED APPLICATIONS

This application is based upon and claims the benefit of prior German Patent Application No. 10 2016 103 931.4, filed on Mar. 4, 2016, the entire contents of which are incorporated herein by reference.

TECHNICAL FIELD

The present disclosure relates to a screw and a screw connection between a support component and an additional component, wherein the support component has a tube made of plastic to accommodate the screw in a friction and positive fit and at least the tube is made of foamed plastic. The present disclosure also relates to a method of connecting a support component to another component using a screw.

BACKGROUND

Plastics are used in many fields such as the automotive industry, mainly due to their great strength and low weight. Special demands are required for screw connections used to obtain a detachable connection of plastic components. Conventional sheet metal or wood screws do not currently meet these demands. Thread-forming or thread-rolling screws are generally subsumed under the term "wood screws." These screws are comprised primarily of a head and a screw core or shaft in the form of an elongated cone or pin that tapers to a point at the tip of the screw. The screw core is surrounded by a helical peripheral cutting edge projecting radially from the thread root, which transitions into the two flanks of the cutting thread with a sharp bend. The flanks in turn are provided with a constant pitch from the thread root to the crest, resulting in a uniform thread angle between the two flank lines. Screws of this kind are also used to screw plastics together.

In addition, competition focusing on light-weight construction in the automotive industry has resulted in an ever-growing range of applications for plastics, including increasing use of physical or chemical foams which replace the plastic material with air (for e.g., nitrogen or carbon dioxide). In the case of physical foams produced using MuCell® or similar processes, substances such as nitrogen, carbon dioxide or a chemical blowing agent are injected under pressure in a supercritical state into the molten plastic and uniformly distributed. After injection into the unpressurized mold, the gas separates from the smelt and forms a fine-celled foam structure. The omission of holding pressure and the reduced viscosity, minimizing or eliminating sink marks and strain are the primary aspects in support of this trend.

When used in plastics, including foamed plastics, prior art screws suffer from various drawbacks. For example, they damage the plastic they are driven into, for instance, by rupturing the screw-in openings or by stress cracking. At the same time they also require relatively high screw-in torque. In screw connections using MuCell® injection molded parts, the compact layer (i.e. the outer layer of the component) is destroyed, resulting in the conventional screw completely losing its hold in the remnants of the foam layer.

Additional methods for attaching plastic parts are discloses in German Patent Document DE 100 48 975 C1, German Patent Document DE 10 2009 024 264 A1, and European Patent Document EP 2 185 828 B1. For example, DE 100 48 975 C1 discloses a nut of foamed POM with a cylindrical inner bore, that is screwed onto a threaded bolt. The nut in this case may elastically compress its way through the foamed material, or the thread of the bolt may press into the nut when the nut is screwed on. DE 10 2009 024 264 A1 discloses a nut with sections that have different inner diameters in order to prepare it for use with threaded bolts that have different outer diameters. EP 2 185 828 B1 describes a screw with truncated thread crests and acute thread base angles to produce a thread the first time the screw is driven in.

German Patent Document DE 10 2014 114 165 discloses a screw for integral foamed parts that is suitable for non-thread-rolling use in a tube.

SUMMARY

Embodiments of the present disclosure provide a screw for improving the direct connection between the screw and a foamed plastic when the screw-in torque forces are relatively high.

According to the present disclosure, a screw connection is provided that comprises a support component, an additional component and a screw to affix the support component to the additional component, in which the support component has a tube or screw boss of plastic to accommodate the screw in a friction and positive fit. The tube may consist of thermoplastic foam.

According to embodiments of the present disclosure, the screw has a blunt-edged thread, wherein the screw compresses the foam of the tube as it is driven in. The ratio of the inner diameter of the tube to the diameter of the screw depends on the degree of foaming of the tube. The greater the degree of foaming, the lower the ratio. A low degree of foaming is based on the proportion of gas in the component volume or the reduced density of the component by the addition of the gas. For example, with a degree of foaming of 2-5% the ratio is greater than 0.8 and may lie between 0.85 and 0.95. As the degree of foaming increases, the ratio decreases. For example, with a degree of foaming of 5-10% the ratio may lie between 0.7 and 0.9, or between 0.75 to 0.85. With a degree of foaming of greater than 10% the ratio may be 0.5 to 0.8, or 0.6 to 0.8.

According to embodiments of the present disclosure, adding glass fibers or other stabilizing additives while the degree of foaming remains the same increases the ratio. Compared to conventional screws, the screw threads may penetrate less deeply into the foam material or displace it. This effect may prevent damage to the tube while still enabling a very tight fit.

According to embodiments of the present disclosure, the profile is formed by using a blunt-edged thread. This may enable the thermoplastic foam to closely adapt its shape to the blunt thread crests and roots through plastic deformation and friction as the screw is being screwed in, without the thermoplastic foam being cut. In other words, while the screw is being screwed in, the material is displaced and compacted rather than being invasively cut. Cracking and rupturing of the tube or screw-in opening may thereby be avoided, as the thread impressed by the screw is more resistant to overtightening of the screw, i.e. to shearing off of cut screw threads. Thus, the screw can be driven in and removed repeatedly.

According to embodiments of the present disclosure, the threads have flank angles of 30°-90°, and may have flank angles that are greater than 60°, measured from crest to root of the screw. This results in a blunt shape in which the angle may vary across the expanse of the flank.

According to embodiments of the present disclosure, the blunt threads, but also a rounded out transition between the flanks and the thread root, result in a notch-free screw profile, whereby stress on the plastic and/or foam may be further reduced.

According to embodiments of the present disclosure, the transition between the flanks and the thread root may occur by sections, with the thread range as the first segment having a flank angle of 30°-90° or greater than 60°. The second segment in the transition between the flank and the thread root may represent a tangential transition with angles of 145°-170°. The third segment encompasses the thread root between two flanks and may represent a segment of a circle with angles of 170°-180°.

According to embodiments of the present disclosure, the edges of the thread are rounded and particularly spaced apart from the tip of the screw. Cutting into the material may create a weakening of the material at the cut edge. Rounded edges may keep the screw from cutting into the material. Instead, the screw is screwed into the material by displacement and compaction.

According to embodiments of the present disclosure, the material of the tube is displaced gently when the ratio of thread height to width is less than 1, or when the ratio is less than 2.

According to embodiments of the present disclosure, the screw has a tip to puncture the bottom of the tube. The thread there is not rounded, but rather sharpened to a point or sharp edge. Here the thread may also be thread cutting to ease penetration into the bottom of the tube. As an alternative, the screw can be configured relative to the tube in such a manner that the screw has a blunt tip that jams (i.e. is tightly fixed) in the bottom of the tube when it is screwed in. Accordingly, when the tip reaches the bottom of the tube, the screw is additionally pressed into the threads that have been created in the tube by displacement, whereby the clamping forces of the screw in the tube are intensified.

According to embodiments of the present disclosure, the thread pitch may vary. Varying the pitch means that the spacing between adjacent threads is not constant. Changing the pitch causes the material to be compressed or stretched as the screw is screwed in. This additional tensing of the material by the screw increases the strength of the connection. Increasing the distance of the thread from the tip of the screw may result in greater friction and/or higher torque at the end of the screwing-in operation, when the area of the smaller pitches increases.

In an embodiment of the present disclosure, the spacing varies between the edge of the thread and a middle axis of the screw. This may happen near the screw head. The distance could increase closer to the screw head. A larger distance of the edge means a larger thread area exerting friction in the tube, which may result in greater friction or larger torque at the end of the screw-in operation.

According to embodiments of the present disclosure, a profile of the thread has a varying geometrical shape. For example, the angularity of the thread increases as it nears the head of the screw. The torque at the start of removing the screw is maintained at a high level by the increased angularity near the screw head.

According to embodiments of the present disclosure, the screw has pitch values greater than 2 millimeters (mm), depending on the screw length and diameter, in order to keep as much material of the compact layer as possible from rupturing between two threads.

According to embodiments of the present disclosure, the screw has a washer with an enlarged diameter compared to the screw head. The washer is either fixed or freely rotates on the screw head.

According to embodiments of the present disclosure, the screw connection in automotive engineering applications can be realized with a screw having a diameter of 4, 4.5, 5, 5.5 or 6 mm and a length of 12 to 20 mm.

According to embodiments of the present disclosure, the thermoplastic foam of the tube of the component is produced in a chemical or physical foaming process, specifically a MuCell® process. This yields an inner and outer tube structure for which the given screw geometry is well suited, to enable a heavy-duty connection between the screw and the foamed plastic, even in the case of different plastic consistencies.

According to embodiments of the present disclosure, at least the tube consists of an integral foam or a microcellular foam with a compact outer layer. To improve the thermal insulating properties, the plastic layer can include gas deposits. These gas deposits, for example may be produced using the MuCell® process. In this method, small, precisely dosed quantities of nitrogen and carbon dioxide are introduced into the plastic smelt during the injection process. By this method, cell structures can be obtained that are stress-free and therefore uniformly dimensioned. Aside from the use of nitrogen and carbon dioxide, however, it is also possible to use other chemical or physical blowing agents.

According to embodiments of the present disclosure, the plastic layer has a gas deposit that permits cell pore concentrations in the range of 107 to 1010 cells/cm$^3$ by volume of the plastic layer.

According to embodiments of the present disclosure, the tube has side walls 0.1 to 3 mm thick, for example 0.7 to 1.5 mm. The tube also has a bottom 0.1 to 3 mm thick, for example 0.7 to 1.5 mm. Even if the side wall, i.e. the compact outer layer, is very thin (i.e. the proportion of foam is still small), the screw of the present disclosure is capable of preventing destruction of the compact layer as the screw is driven in.

Conventional screws to be directly screwed into plastic require a clear space at the bottom of the tube to accommodate plastic residue accumulating from the thread cutting. By contrast, in embodiments of the present disclosure, the tube with the screw can be shorter. For example, the height of the tube may be less than one screw length. Therefore, the screw tip breaks through the bottom of the tube or becomes jammed at the bottom. Accordingly, no clear space is necessary since the displacement does not leave any chips.

According to embodiments of the present disclosure, the tube associated with the screw may be modified for easier screwing action. For example, the tube mouth may be widened at an angle that is greater than that obtained in sloping caused purely by tools. The angle to an axis that is perpendicular to the tube mouth may be 0.5 to 5°, or 3° to 5°.

According to embodiments of the present disclosure, a method of connecting a support component to another component using a screw is disclosed. The method includes the following steps: forming a support component with a tube from a thermoplastic foam, using a chemical or physical foaming process, such as a MuCell® process; providing a screw having several blunt-edged threads with an outer diameter that is larger at least in parts than the inner diameter of the tube, with the ratio of the inner diameter of the tube to the outer diameter of the screw being greater than 0.8, for example lying between 0.85 and 0.95; placing an additional component onto the tube; and screwing in the screw through the additional component into the tube in a non-thread-rolling manner, wherein the screw compacts the foam of the tube as it is driven in. This method makes it possible to reuse the screw up to ten times with no destructive effects.

According to embodiments of the present disclosure, a screw for a screw connection with a support component made of thermoplastic foam is disclosed. The screw comprises a screw head; and a screw shaft comprising a blunt-edged thread for compacting the foam, the thread having flank angles (w) of 30°-90°; wherein the support component comprises a tube with a predetermined degree of foaming of at least 2%; and the ratio of an inner diameter of the tube to an outer diameter of the screw shaft is based on the degree of foaming of the tube, the ratio decreasing as the degree of foaming increases.

According to embodiments of the present disclosure, a screw connection is disclosed. The screw connection comprises a support component made of thermoplastic foam, the support component comprising a tube with a predetermined degree of foaming of at least 2%; and a screw for connecting the support component to an additional component, the screw comprising a screw shaft having a blunt-edged thread for compacting the foam, the threads having flank angles (w) of 30°-90°; wherein the ratio of an inner diameter of the tube to an outer diameter of the screw shaft is based on the degree of foaming of the tube, the ratio decreasing as the degree of foaming increases.

According to embodiments of the present disclosure, a method of connecting a support component to an additional component is disclosed. The method includes the following steps: forming, using a chemical or physical foaming process, the support component with a tube made of thermoplastic foam; providing a screw having multiple blunt-edged threads on a shaft of the screw, the threads having flank angles (w) of 30°-90°, wherein an outer diameter of the shaft is larger at least in parts than an inner diameter of the tube, and a ratio of the inner diameter of the tube to the outer diameter of the shaft depends on the degree of foaming, the ratio decreasing as the degree of foaming increases; placing an additional component onto the tube; and screwing in the screw in a non-thread-rolling manner through the additional component and into the tube, wherein the foam of the tube is compacted as the screw is driven in The described properties of the present disclosure and the manner in which these are achieved will be described in more detail based on the following detailed description. The foregoing general description and the following detailed description are exemplary and explanatory only, and are not restrictive of embodiments consistent with the present disclosure. Further, the accompanying drawings illustrate embodiments of the present disclosure, and together with the description, serve to explain principles of the present disclosure.

DETAILED DESCRIPTION

Figure 1:
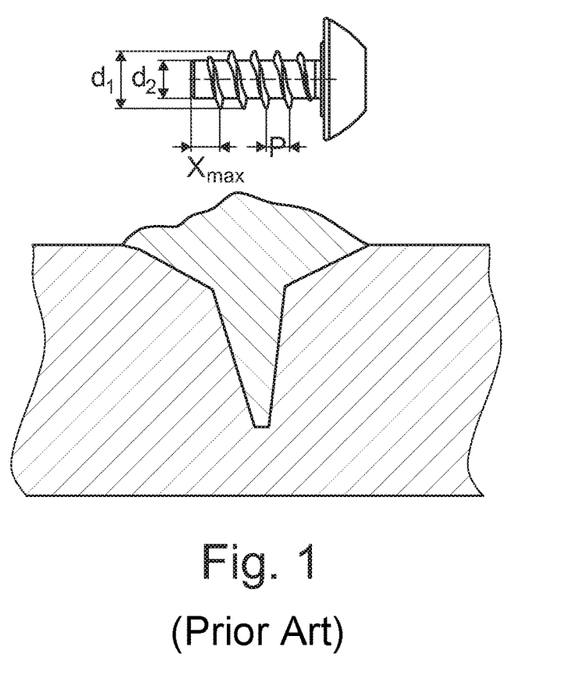
FIG. 1 shows a cross-sectional view through a conventional prior art plastic tube of compact injection molded material with a thread-rolling screw.

FIG. 1 shows a lateral view of a section through a plastic tube of compact injection molding material, with a conventional thread-rolling screw. The screw includes a major diameter $d_1$, a minor diameter $d_2$, a pitch P, and a distance $X_{max}$ from the bottom of the screw to a first thread. When used in plastics, the known, sharp-edged screw damages the plastic on being screwed in, by rupturing the screw-in openings or by stress cracking. Additionally, relatively high torque is required to drive the screw.

In screw connections using MuCell® injection molded parts, the compact layer is destroyed by this type of screw. As a result, a conventional screw completely loses its hold in the remnants of the foam layer and can hardly be screwed in a second time.

Figure 2:
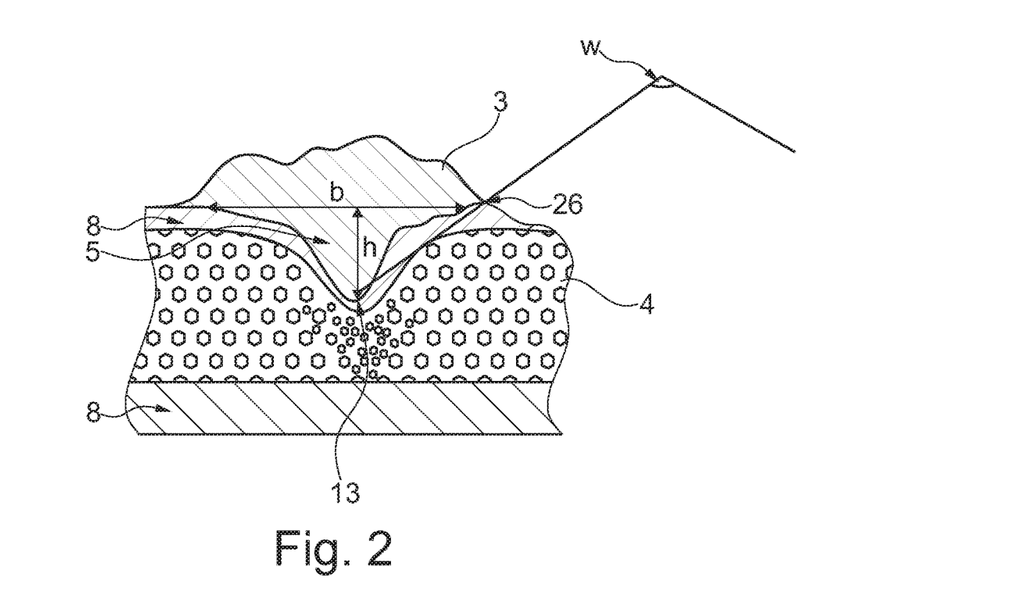
FIG. 2 shows a cross-sectional view through an exemplary plastic tube produced using a MuCell® process.

FIG. 2 shows a lateral view of a section through a plastic tube 4 produced using a MuCell® or other similar process, with a screw 3 according to the present disclosure. The outer shape of the screw 3 may be conical. Typically, the screw has a major diameter measuring 4, 4.5, 5, 5.5 or 6 mm, and a screw length of 12 to 20 mm.

The tube 4 consists of an integral foam or a microcellular foam with a compact outer layer (i.e. compact layer 8). Giving the screw 3 a profile with blunt thread crests 13 and rounded thread roots (such as profile shown in FIG. 4) enables the compact outer layer of thermoplastic foam to closely adapt its shape, by plastic deformation and friction, to the screw as it is being screwed in, without the outer layer being cut. The material displacement or compaction is illustrated in FIG. 2. The compact layer 8 is not ruptured, but rather is merely pressed into the softer inner layers of the tube 4. These layers, with a proportion of foam of 2 to 5%, possess a certain degree of elasticity, such that after the screw 3 is removed the "thread" reverts to its original form. Cracking or rupturing of the tube 4 may therefore be avoided. This is aided by a thread angle (w) of the thread 5 being obtuse, for example 110°.

Figure 3:
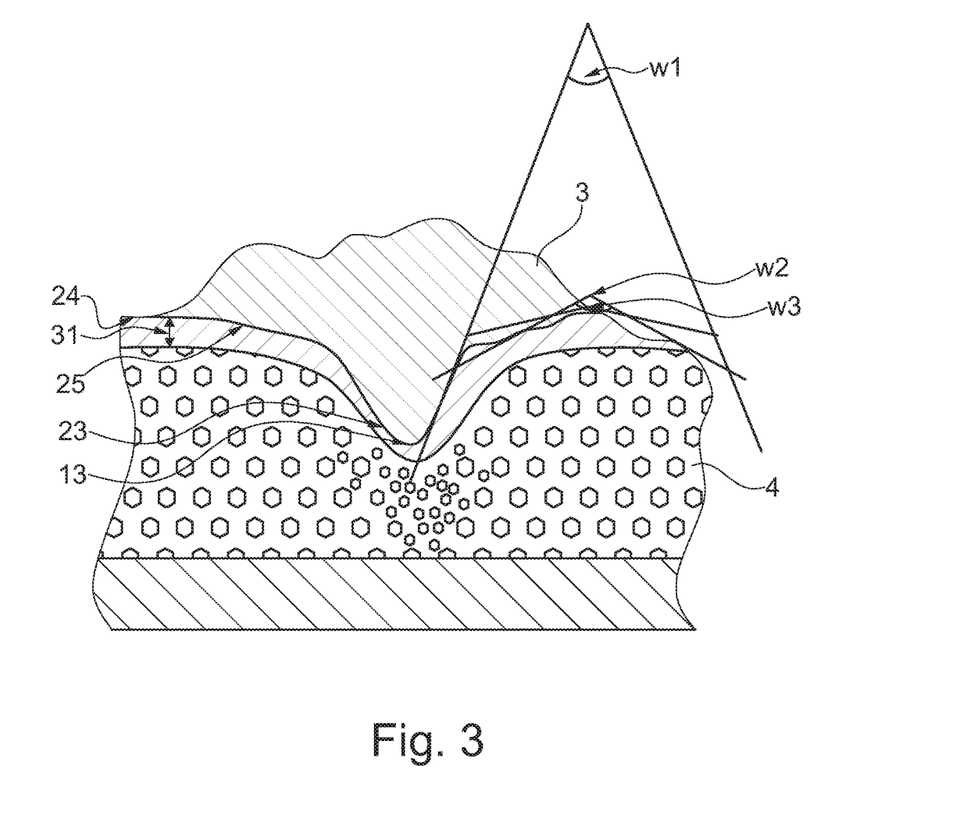
FIG. 3 shows a cross-sectional view through an exemplary thread providing information on the profile of the thread.

For example, the transition between the flanks and the thread root here takes place section by section. As the first segment (flank 23), the outer thread area in FIG. 3 has flank angles of 30°-90°, or flank angles greater than 60°. The transition to the second section or segment 25 can be a clean break. The second segment 25 in the transition between the flank 23 and the thread root 24 represents a tangential transition with angles w2 of 145°-170°. The third segment encompasses the thread root 24 between two flanks 23 and represents a segment of a circle with angles w3 of 170°-180°.

Figure 4:
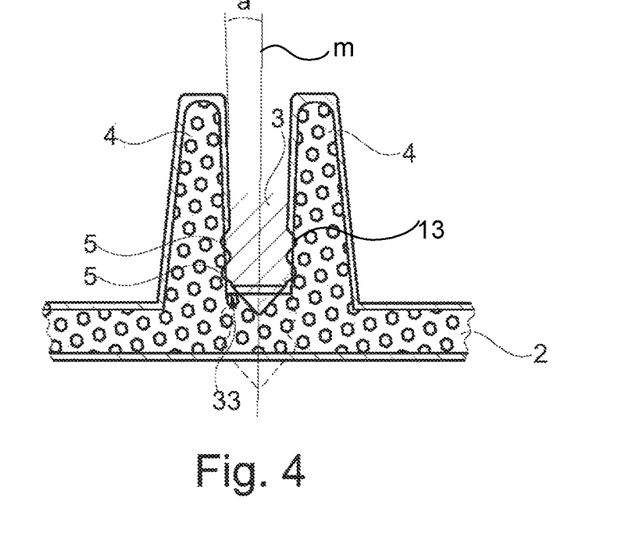
FIG. 4 shows a cross-sectional view through an exemplary plastic tube produced using a MuCell® process.
Figure 5:
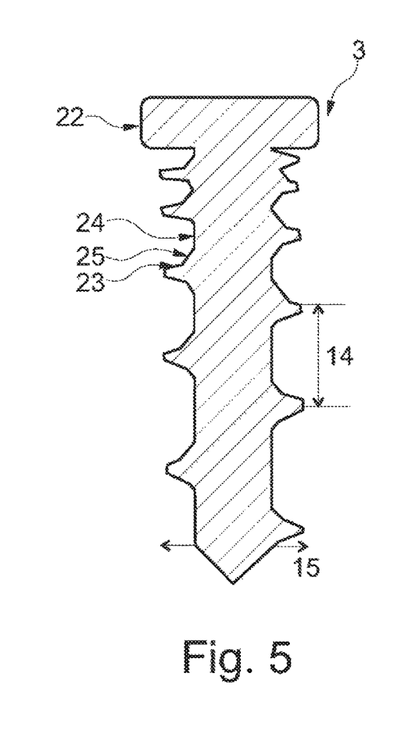
FIGS. 5 and 6 show additional embodiments of the screw according to the present disclosure.
Figure 7:
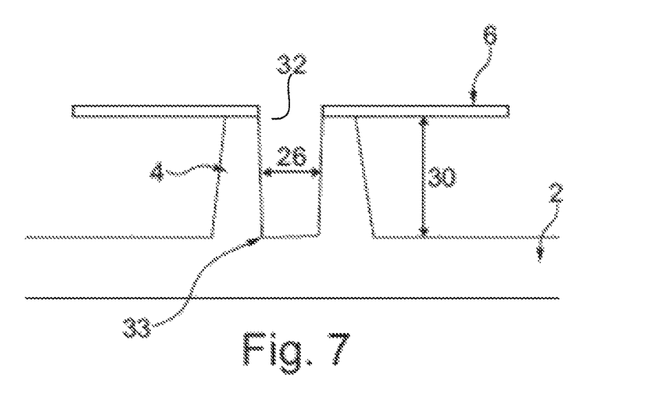
FIGS. 7 to 9 show the interaction of the tube with various screws of the present disclosure.

FIG. 4 shows another embodiment, a section through a support component 2 with a plastic tube 4 produced using a MuCell® process or a similar process, during the screw-in operation. The tube 4 shown represents a stress-relief tube that is fundamentally smaller than a compact tube. For the screw 3 of the present disclosure, the ratio of the inner diameter 26 (as shown in FIG. 7) of the tube 4 to the outer diameter 15 (as shown in FIG. 5) of the screw 3 at the selected degree of foaming of 2-5% amounts to 0.85 to 0.95 and is thus considerably larger than that of conventional screws with a ratio of 0.8. If the degree of foaming is increased, the ratio becomes smaller. The material of the tube 4 situated "behind" the compact layer 8 is softer and generates a low counteracting force. Therefore, the screw 3 will have to penetrate farther into the tube 4 in order to create equal torque. If glass fibers or other reinforcing elements are injected into the plastic of the tube 4 or support component 2 with the same degree of foaming, then the linkage increases, the tube 4 becomes more stable (in spite of the higher degree of foaming), and the ratio may be enlarged again. A large ratio (approaching 1) enables less material to be required for the same screw.

When it is screwed in, the screw 3 presses itself into the outer layer of the tube 4 and penetrates the tube bottom 33. The tube 4 is slightly open such that the tube side walls are angled. The opening angle a of the tube sidewalls is 3-5° in relation to a central axis of the tube (where the central axis is perpendicular to the tube bottom 33). Similar to an insertion guide this makes it easier to set the screw 3 in the tube 4. The torque exerted on driving in the screw increases through the angle a.

Figure 6:
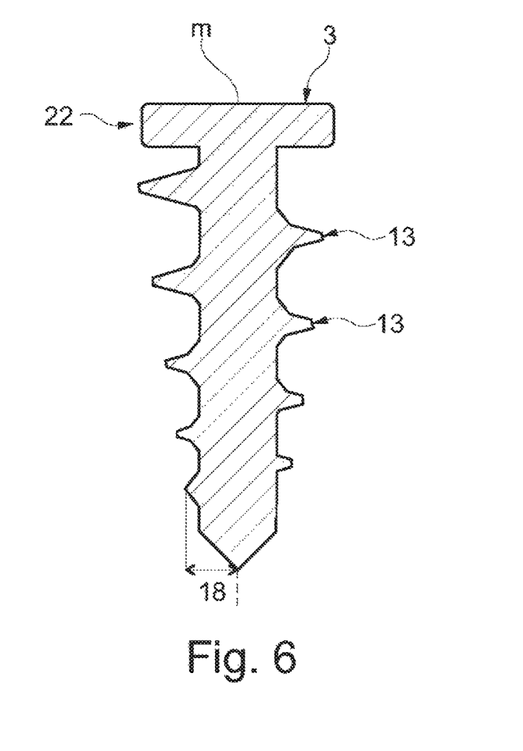

FIGS. 5 and 6 are schematic views of two exemplary variants of the screw 3, each having a screw head 22 connected to a screw shaft. The screw 3 according to FIG. 5 illustrates the segmentation of the threads. The flank rises in two steps 23, 25 from a thread root 24. As shown in FIG. 5, the pitch 14 of the threads may vary. The pitch 14 in FIG. 5, for example, decreases in a direction towards the screw head 22, with the result that the torque increases as the screwing-in operation nears completion.

In contrast, the screw in the embodiment shown in FIG. 6 shows that the distance 18 between the crest 13 of the thread and a center axis m of the screw shaft may vary. Increasing the distance 18 as the thread approaches the screw head 22 enables an increase in torque as the screwing-in operation nears completion.

FIG. 7 shows the tube 4 of the support component 2 prior to the screwing-in operation. An additional component 6 is placed on the tube 4 and is intended to be connected to the support component 2 to form a screw connection. The tube 4 has a height 30 reaching from its mouth 32 to its bottom 33. The mouth 32 is larger than the inner diameter 26 of the tube 4 (as measured approximately midway of the height 30). This is based on an opening angle a in the range of 3-5°, as explained above.

Figure 8:
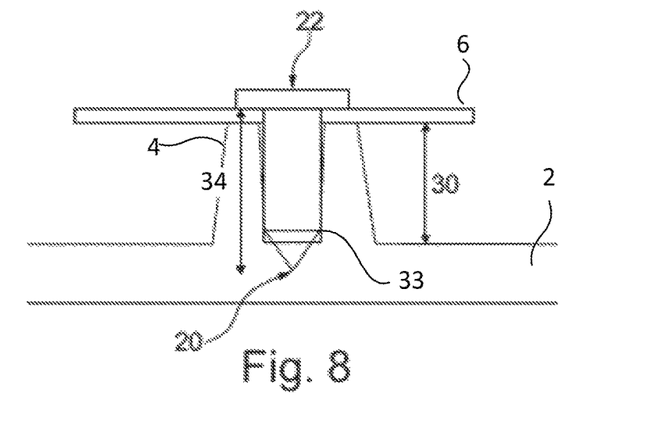
Figure 9:
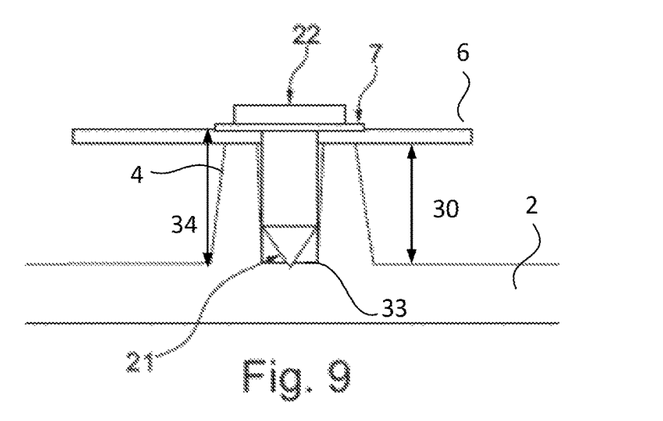

FIGS. 8 and 9 show screws 3 with different lengths 34 and tips 20, 21. The tip of the screw may be blunt or sharply pointed. The tip 20 of the screw in FIG. 8 can have a short, pointed cutting portion that then transitions into a blunt shape. The transition may be smooth or abrupt. This tip 20, with a thread-cutting section, is adapted to puncture the bottom 33 (as shown in FIG. 7) of the tube 4 and to roll a thread into this bottom 33. For this purpose the screw 3 is longer (length 34 from the screw head 22 to the tip 20) than the height 30 of the tube 4.

The screw 3 of FIG. 9 may be shorter, but still slightly longer than the height 30 of the tube 4. When this screw 3 is driven in it will jam at the bottom 33 of the tube 4 to form a tight fit. This means that the tip 21 may be blunt and does not need to puncture the bottom. Nevertheless, the torque increases near the end of the screwing-in operation due to the jamming. FIG. 9 further shows that a freely rotating washer 7 is added at the screw head 22 to distribute the force over a larger area when the additional component 2 is fixed in place.

LIST OF REFERENCE NUMBERS

| | |
|---|---|
| screw connection | 1 |
| carrier/support component | 2 |
| screw | 3 |
| tube | 4 |
| threads | 5 |
| additional component | 6 |
| washer | 7 |
| compact/outer layer | 8 |
| crest of the thread | 13 |
| pitch | 14 |
| outer diameter of the screw | 15 |
| distance, crest to center axis | 18 |
| screw tip | 20, 21 |
| screw head | 22 |
| flank, first segment | 23 |
| thread root | 24 |
| second segment | 25 |
| inner diameter of the tube | 26 |
| height of the tube | 30 |
| bottom thickness | 31 |
| tube mouth | 32 |
| tube bottom | 33 |
| length of screw | 34 |
| angle of the tube side walls | a |
| thread width | b |
| thread height | h |
| center axis of the screw | m |
| thread flank angle | w |
| angles at thread segments | w1, w2, w3 |

What is claimed is:

1. A screw for a screw connection with a support component made of thermoplastic foam, the screw comprising:
   a screw head; and
   a screw shaft comprising a blunt-edged thread for compacting the foam, the thread having flank angles (w) of 30°-90°; wherein:
      the thread includes a plurality of flank segments, each segment of the plurality of flank segments having a different flank angle,
      wherein the plurality of flank segments include a first segment comprising an outer thread area having flank angles of 30°-90°,
      a second segment between a first flank and a thread root, the second segment having a tangential transition with angles of 145°-170°, and
      a third segment at the thread root between the first flank and a second flank, the third segment having angles of 170°-180°.

2. The screw according to claim 1, wherein a ratio of an inner diameter of a tube of the support component to an outer diameter of the screw shaft is based on a degree of foaming of the tube, the ratio following a relationship such that a first ratio for a tube having a first degree of foaming is greater than a second ratio for a tube having a second degree of foaming, the second degree of foaming being greater than the first degree of foaming, and the ratio is one of:
   greater than 0.8 with a degree of foaming of 2-5%;
   between 0.7 and 0.9 with a degree of foaming of 5-10%; or
   between 0.5 and 0.8 with a degree of foaming of greater than 10%.

3. The screw according to claim 1, wherein the thread has flank angles (w) of approximately 60°-90°.

4. The screw according to claim 1, wherein the screw shaft comprises a tip configured to puncture a bottom section of the tube.

5. The screw according to claim 4, wherein the thread comprises rounded crests at least in sections at a distance from the tip of the screw shaft.

6. The screw according to claim 1, wherein the screw shaft comprises thread pitches greater than 2 millimeters.

7. The screw according to claim 6, comprising a thread-cutting thread restricted to a segment near a tip of the screw shaft.

8. The screw according to claim 1, wherein the screw shaft comprises a blunt tip configured to be tightly fixed at a bottom of the tube when screwed in.

9. The screw according to claim 1, wherein the screw shaft comprises a tip and thread pitches, the thread pitches increasing in a direction along the thread toward the tip.

10. The screw according to claim 1, wherein the screw shaft comprises a tip, and a distance of a crest of the thread from a center axis of the screw decreases in a direction toward the tip.

11. The screw according to claim 1, wherein a profile of the thread varies in its geometrical form such that an angularity of the thread increases in a direction toward the screw head.

12. The screw according to claim 1, comprising one of a fixed or freely rotating washer having a diameter greater than a diameter of the screw head.

13. The screw according to claim 1, wherein the screw shaft has an outer diameter of 4 to 6 millimeters and a length of 12 to 20 millimeters.

14. The screw according to claim 1, wherein the thread has a height and a width, a ratio of the height to the width being less than 1.

15. The screw according to claim 1, wherein the thread comprises flanks, the thread root, and a rounded transition between the flanks and the thread root.

16. The screw according to claim 15, wherein the transition between the flanks and the thread root comprises segments.

17. A screw connection comprising:
a support component made of thermoplastic foam, the support component comprising a tube with a predetermined degree of foaming of at least 2%; and
a screw for connecting the support component to an additional component, the screw comprising a screw shaft having a blunt-edged thread for compacting the foam, the threads having flank angles (w) of 30°-90°;
wherein the ratio of an inner diameter of the tube to an outer diameter of the screw shaft is based on the degree of foaming of the tube, the ratio for a tube having a first degree of foaming being greater than the ratio for a tube having a second degree of foaming, the second degree of foaming being greater than the first degree of foaming.

18. The screw connection according to claim 17, wherein the thermoplastic foam comprises one of a foam produced by a chemical or physical foaming process or an integral foam injection molding processed foam.

19. The screw connection according to claim 18, wherein at least the tube comprises a compact outer layer with one of an integral foam or a microcellular foam.

20. The screw connection according to claim 18, wherein the tube comprises a compact layer having a side-wall thickness of 0.1 to 3 millimeters, and a bottom thickness of 0.1 to 3 millimeters.

21. The screw connection according to claim 18, wherein the tube comprises a compact layer having a side-wall thickness of 0.7 to 1.5 millimeters, and a bottom thickness of 0.7 to 1.5 millimeters.

22. The screw connection according to claim 18, wherein:
the screw comprises a screw head having a base;
the screw shaft comprises a tip; and
the tube has an inner height smaller than a length of the screw from the tip to the base.

23. The screw connection according to claim 18, wherein the tube comprises a base, a mouth, and a central axis perpendicular to the mouth, the tube widening towards the mouth such that an angle perpendicular to the central axis lies between 0.5 and 5°.

24. A method of connecting a support component to an additional component, the method including the following steps:
providing a screw comprising:
a screw head; and
a screw shaft comprising a blunt-edged thread for compacting a foam, the thread having flank angles (w) of 30°-90°; wherein:
the thread includes a plurality of flank segments, each segment of the plurality of flank segments having a different flank angle,
wherein the plurality of flank segments include a first segment comprising an outer thread area having flank angles of 30°-90°,
a second segment between a first flank and a thread root, the second segment having a tangential transition with angles of 145°-170°, and
a third segment at the thread root between the first flank and a second flank, the third segment having angles of 170°-180°;
placing an additional component onto a tube made of the foam; and
screwing in the screw in a non-thread-rolling manner through the additional component and into the tube, wherein the foam of the tube is compacted as the screw is driven in.

* * * * *